US012514600B2

(12) United States Patent
Schabert

(10) Patent No.: US 12,514,600 B2
(45) Date of Patent: Jan. 6, 2026

(54) SINGLE LUMEN BALLOON GUIDE CATHETER

(71) Applicant: Deepin Technologies, LLC, San Jose, CA (US)

(72) Inventor: Jon Schabert, San Jose, CA (US)

(73) Assignee: Deepin Technologies, LLC, San Jose, CA (US)

( * ) Notice: Subject to any disclaimer, the term of this patent is extended or adjusted under 35 U.S.C. 154(b) by 266 days.

(21) Appl. No.: 18/471,010

(22) Filed: Sep. 20, 2023

(65) Prior Publication Data

US 2024/0099732 A1    Mar. 28, 2024

Related U.S. Application Data

(60) Provisional application No. 63/410,627, filed on Sep. 28, 2022.

(51) Int. Cl.
*A61B 17/22* (2006.01)
*A61B 17/00* (2006.01)
(Continued)

(52) U.S. Cl.
CPC .... *A61B 17/22* (2013.01); *A61B 2017/00336* (2013.01); *A61B 2017/22067* (2013.01);
(Continued)

(58) Field of Classification Search
CPC .......... A61B 17/22; A61B 2017/00336; A61B 2017/22067; A61B 2017/22074;
(Continued)

(56) References Cited

U.S. PATENT DOCUMENTS 3,438,375 A  *  4/1969  Ericson  ............. A61M 25/1002
                                              604/98.01
4,921,483 A     5/1990  Wijay
(Continued)

FOREIGN PATENT DOCUMENTS

CN      113117227 A     12/2018
WO      2007033963      3/2007
(Continued)

OTHER PUBLICATIONS

CNIPA, Office Action and Search Report in Chinese Application No. 202300270751, Sep. 10, 2025, 22 pages.

*Primary Examiner* — Jocelin C Tanner
(74) *Attorney, Agent, or Firm* — Deepin IP

(57) ABSTRACT

A balloon catheter includes a tubular body and a balloon circumferentially around a portion of the tubular body. The tubular body includes an outer surface and an inner surface defining a lumen of the tubular body. The balloon comprises a proximal end portion and a distal end portion each being secured to the tubular body, and a distensible portion defining an interior that is in fluid communication with the lumen of the tubular body. The distal end portion of the balloon extends through the outer surface and the inner surface into the lumen of the tubular body, forming a sealing portion circumferentially around the inner surface of the tubular body. A catheter assembly including a balloon catheter and a method of use are also provided.

24 Claims, 5 Drawing Sheets

(51) Int. Cl.
*A61B 90/00* (2016.01)
*A61M 25/06* (2006.01)
*A61M 25/10* (2013.01)

(52) U.S. Cl.
CPC .............. *A61B 2017/22079* (2013.01); *A61B 2090/3933* (2016.02); *A61B 2090/3966* (2016.02); *A61M 2025/0681* (2013.01); *A61M 2025/1079* (2013.01)

(58) Field of Classification Search
CPC .. A61B 2017/22079; A61B 2017/3441; A61B 2090/0811; A61B 2090/3933; A61B 2090/3966; A61B 2217/005; A61M 25/0662; A61M 25/10; A61M 2025/0681; A61M 2025/1052; A61M 2025/1063; A61M 2025/1077; A61M 2025/1079
USPC .......................................................... 606/159
See application file for complete search history.

(56) References Cited

U.S. PATENT DOCUMENTS

| | | | |
|---|---|---|---|
| 5,102,403 A | 4/1992 | Alt | |
| 5,295,960 A * | 3/1994 | Aliahmad | A61M 25/10 604/103 |
| 5,364,347 A | 11/1994 | Jang | |
| 5,454,788 A | 10/1995 | Walker | |
| 5,609,606 A | 3/1997 | O'Boyle | |
| 5,611,807 A | 3/1997 | O'Boyle | |
| 5,658,251 A | 8/1997 | Ressemann | |
| 5,693,015 A | 12/1997 | Walker | |
| 5,697,948 A | 12/1997 | Marin | |
| 5,720,724 A | 2/1998 | Ressemann | |
| 5,785,685 A | 7/1998 | Kugler | |
| 5,795,331 A | 8/1998 | Cragg | |
| 5,891,133 A | 4/1999 | Murphy-Chutorian | |
| 5,941,870 A | 8/1999 | Jang | |
| 6,066,114 A | 5/2000 | Goodin | |
| 6,071,227 A | 6/2000 | Popowski | |
| 6,135,977 A | 10/2000 | Drasler | |
| 6,264,632 B1 | 7/2001 | Jang | |
| 6,361,529 B1 | 3/2002 | Goodin | |
| 6,440,097 B1 | 8/2002 | Kupiecki | |
| 6,514,228 B1 | 2/2003 | Hamilton | |
| 6,613,066 B1 | 9/2003 | Fukaya | |
| 6,635,029 B1 | 10/2003 | Venturelli | |
| 6,712,783 B1 | 3/2004 | Jang | |
| 6,726,700 B1 | 4/2004 | Levine | |
| 2003/0004461 A1 | 1/2003 | Kupiecki | |
| 2004/0092869 A1 | 5/2004 | Venturelli | |
| 2004/0102719 A1 | 5/2004 | Keith | |
| 2004/0267239 A1 | 12/2004 | Jang | |
| 2005/0059890 A1 | 3/2005 | Deal | |
| 2005/0059990 A1 | 3/2005 | Ayala | |
| 2005/0070794 A1 | 3/2005 | Deal | |
| 2005/0070821 A1 | 3/2005 | Deal | |
| 2005/0209674 A1 | 9/2005 | Kutscher | |
| 2007/0270935 A1 | 11/2007 | Newhauser | |
| 2008/0243171 A1 | 10/2008 | Ressemann | |
| 2009/0005755 A1 | 1/2009 | Keith | |
| 2012/0265135 A1 | 10/2012 | Porter | |
| 2012/0316436 A1 | 12/2012 | Lentz | |
| 2014/0155980 A1 * | 6/2014 | Turjman | A61F 2/844 623/1.2 |
| 2014/0257182 A1 | 9/2014 | Eaton | |
| 2015/0151081 A1 | 6/2015 | Keith | |
| 2017/0087335 A1 | 3/2017 | Eaton | |
| 2017/0189644 A1 | 7/2017 | Fischer | |
| 2018/0098778 A1 | 4/2018 | Ogle | |
| 2020/0206483 A1 | 7/2020 | Bagaoisan | |
| 2020/0353205 A1 | 11/2020 | Kelly | |
| 2021/0386440 A1 | 12/2021 | Ogle | |

FOREIGN PATENT DOCUMENTS

| | | |
|---|---|---|
| WO | 2014113257 | 7/2014 |
| WO | 2016207865 | 12/2016 |
| WO | 2018231857 | 12/2018 |

* cited by examiner

SINGLE LUMEN BALLOON GUIDE CATHETER

CROSS-REFERENCE TO RELATED APPLICATIONS

This application claims priority to U.S. provisional patent application No. 63/410,627 filed Sep. 28, 2022 entitled "Single Lumen Balloon Guide Catheter," the disclosure of which is hereby incorporated by reference in its entirety.

TECHNICAL FIELD

This application relates generally to medical devices and methods of using medical devices. In particular, various embodiments of a balloon guide catheter and a method of making and using the balloon catheter are described.

BACKGROUND

Balloon guide catheters (BGCs) are known and have been used in various medical procedures including aspiration thrombectomy and other interventional therapy and diagnosis. Conventional dual-lumen balloon guide catheters include an inner catheter body and an outer catheter body, with an inflation lumen being formed between the two catheter bodies. Another type of conventional balloon guide catheters includes a catheter shaft and large inflation lumens along the sides of the catheter shaft. Both types of conventional balloon guide catheters reduce the available size of lumen of a catheter of a given outer diameter. Furthermore, removing the air from conventional balloon guide catheters is difficult, making preparation for use lengthy and difficult. Before the use of a balloon guide catheter, the air within the catheter must be removed so that the balloon inflated with a contrast agent can be visualized by the user. If the air is not removed, the balloon with the air present may not be visualized by the user, risking to overinflate and rupture the balloon. Another reason to minimize presence of the air in the balloon guide catheter is that in case the balloon ruptures, no air would be released into the blood vessel to avoid the risk of air embolization in e.g., intracranial arteries. The reduction in available lumen size for a balloon guide catheter of a given French size and the long time for preparation of use have greatly hindered the adoption of balloon guide catheters in treatment of stroke and other diseases, although clinical data have shown that balloon guide catheters can provide good performances in medical procedures.

Therefore, there remains a general need for improvement of balloon guide catheters. It would be desirable to provide a balloon guide catheter that allows for a large available lumen size for a given outer diameter of the catheter and allows for quick preparation for use.

SUMMARY

In one aspect, embodiments of the disclosure feature a balloon catheter. In general, an embodiment of the balloon catheter comprises a tubular body and a balloon circumferentially around a portion of the tubular body, e.g., the distal end of the tubular body. The tubular body comprises an outer surface and an inner surface defining a lumen of the tubular body. The balloon comprises a proximal end portion and a distal end portion each being secured to the tubular body, and a distensible portion defining an interior that is in fluid communication with the lumen of the tubular body. The distal end portion of the balloon extends through the outer surface and the inner surface into the lumen of the tubular body, forming a sealing portion circumferentially around the inner surface of the tubular body.

In various embodiments of the aspect, the balloon may be located adjacent to the distal end portion of the tubular body.

In various embodiments of the aspect, the balloon catheter may further comprise a radiopaque marker disposed at the distal end portion of the tubular body to indicate the position of the sealing portion of the balloon. The distal end portion of the balloon may extend through the radiopaque marker into the lumen of the tubular body to form a seal. The radiopaque marker comprises a proximal end and a distal end, and the proximal end of the radiopaque mark can be proximal to the sealing portion of the balloon at a predetermined distance.

In various embodiments of the aspect, the tubular body is provided with plural passages in fluid communication with the interior of the balloon and the lumen of the tubular body. The density of the plural passages adjacent to the distal end portion of the balloon can be greater than the density of the plural passages adjacent to the proximal end portion of the balloon.

In various embodiments of the aspect, the tubular body has an outer diameter of 0.110 inches (8 French device) and an inner diameter of ranging from 0.092 inches to 0.098 inches. In some embodiments, the tubular body has an outer diameter of 0.092 inches (7 French device) and an inner diameter of ranging from 0.075 inches to 0.081 inches. In some embodiments, the tubular body has an outer diameter of 0.118 inches and an inner diameter of ranging from 0.104 inches to 0.110 inches.

In some embodiments of the aspect, the sealing portion of the balloon defines an opening having a diameter ranging from 0.094 inches to 0.088 inches configured to provide a fluid-tight seal for an elongate member having an outer diameter ranging from 0.095 inches to 0.090 inches.

In some embodiments of the aspect, the inner surface of the tubular body comprises polytetrafluoroethylene (PTFE), and the balloon is constructed from a material comprising a styrene-isoprene block copolymer.

In a further aspect, embodiments of the disclosure feature a catheter assembly. The catheter assembly comprises a balloon catheter having a lumen and an elongate member to be positioned in the lumen of the balloon catheter. The balloon catheter comprises a tubular body having an outer surface and an inner surface defining the lumen of the balloon catheter, and a balloon circumferentially around a distal end portion of the tubular body. The balloon comprises a proximal end portion and a distal end portion each being secured to the tubular body, and a distensible portion defining an interior that is in fluid communication with the lumen of the balloon catheter. The distal end portion of the balloon extends through the outer surface and the inner surface of the tubular body into the lumen of the balloon catheter, forming a sealing portion circumferentially around the inner surface of the tubular body. The elongate member is longitudinally movable in the lumen of the balloon catheter between a first position and a second position. At the first position, the elongate member is proximal to the sealing portion allowing a fluid to pass through the sealing portion. At the second position, the elongate member is within and substantially fluid-tight sealed by the sealing portion, thereby forming an inflation lumen between the elongate member and the tubular body of the balloon catheter for introducing a fluid to inflate the balloon.

In various embodiments of the aspect, when the elongate member of the balloon catheter is at the second position, the distal end portion of the elongate member extends out of the lumen of the balloon catheter to perform a medical procedure. The elongate member can be an aspiration catheter configured to perform aspiration thrombectomy, or a catheter used as a conduit for delivery medical devices or agents such as a stent retriever configured to perform mechanical thrombectomy, an embolic agent or a guide wire.

In various embodiments of the aspect, the catheter assembly may further comprise a radiopaque marker disposed at the distal end portion of the tubular body to indicate a position of the sealing portion of the balloon. The radiopaque marker may comprise a proximal end and a distal end, wherein the proximal end of the radiopaque mark is proximal to the sealing portion of the balloon at a predetermined distance.

In various embodiments of the aspect, the tubular body of the balloon catheter is provided with plural passages in fluid communication with the interior of the balloon and the lumen of the balloon catheter. The density of the plural passages adjacent to the distal end portion of the balloon can be greater than the density of the plural passages adjacent to the proximal end portion of the balloon.

In various embodiments of the aspect, the tubular body of the balloon catheter has an outer diameter of 0.092 inches and an inner diameter of ranging from 0.075 inches to 0.081 inches.

In various embodiments of the aspect, the tubular body of the balloon catheter has an outer diameter of 0.110 inches (8 French device) and an inner diameter of ranging from 0.092 inches to 0.098 inches.

In some embodiments, the tubular body has an outer diameter of 0.118 inches and an inner diameter of ranging from 0.104 inches to 0.110 inches.

In various embodiments of the aspect, the sealing portion of the balloon defines an opening having a diameter ranging from 0.094 inches to 0.088 inches configured to provide a fluid-tight seal for an elongate member having an outer diameter ranging from 0.095 inches to 0.090 inches.

In a further aspect, embodiments of the disclosure feature a method. In the method, a catheter assembly is provided. The catheter assembly comprises a first catheter and a second catheter positioned in the lumen of the first catheter. The first catheter comprises a tubular body and a balloon circumferentially around a distal end portion of the tubular body. The tubular body comprises an outer surface and an inner surface defining the lumen of the first catheter. The balloon comprises a proximal end portion and a distal end portion each being secured to the tubular body, and a distensible portion defining an interior that is in fluid communication with the lumen of the first catheter. The distal end portion of the balloon extends through the outer surface and the inner surface of the tubular body into the lumen of the first catheter, forming a sealing portion circumferentially around the inner surface of the tubular body. The second catheter is longitudinally movable in the lumen of the first catheter between a first position and a second position. At the first position, the second catheter is proximal to the sealing portion allowing a fluid to pass through the sealing portion. At the second position the second catheter is within and substantially fluid-tight sealed by the sealing portion, thereby forming an inflation lumen between the second catheter and the tubular body of the first catheter for introducing a fluid to inflate the balloon. In the method, the second catheter is positioned at the first position. A fluid is introduced from the proximal end of the lumen of the first catheter and from the proximal end of the lumen of the second catheter respectively and allowed to exit the distal end of the lumen of the first catheter and the distal end of the lumen of the second catheter. Then, the second catheter is positioned at the second position to form the inflation lumen. A fluid is introduced into the inflation lumen to inflate the balloon of the first catheter. The second catheter is withdrawn proximally to allow the fluid in the balloon to exit.

In various embodiments of the aspect, the tubular body of the first catheter is provided with plural passages in fluid communication with the interior of the balloon and the lumen of the first catheter. The density of the plural passages adjacent to the distal end portion of the balloon is greater than a density of the plural passages adjacent to the proximal end portion of the balloon. The density of the plural passages adjacent to the distal end portion of the balloon can be at least twice the density of the plural passages adjacent to the proximal end portion of the balloon. Before the step of withdrawing of the second catheter proximally, the catheter assembly can be held to orient the distal end portion of the balloon upwardly, and the balloon is tapped to allow air bubbles to move up to the distal end portion of the balloon.

This Summary is provided to introduce selected aspects and embodiments of this disclosure in a simplified form and is not intended to identify key features or essential characteristics of the claimed subject matter, nor is it intended to be used as an aid in determining the scope of the claimed subject matter. The selected aspects and embodiments are presented merely to provide the reader with a brief summary of certain forms the invention might take and are not intended to limit the scope of the invention. Other aspects and embodiments of the disclosure are described in the section of Detailed Description.

These and various other aspects, embodiments, features, and advantages of the disclosure will become better understood upon reading of the following detailed description in conjunction with the accompanying drawings.

DETAILED DESCRIPTION OF EMBODIMENTS

Figure 1:
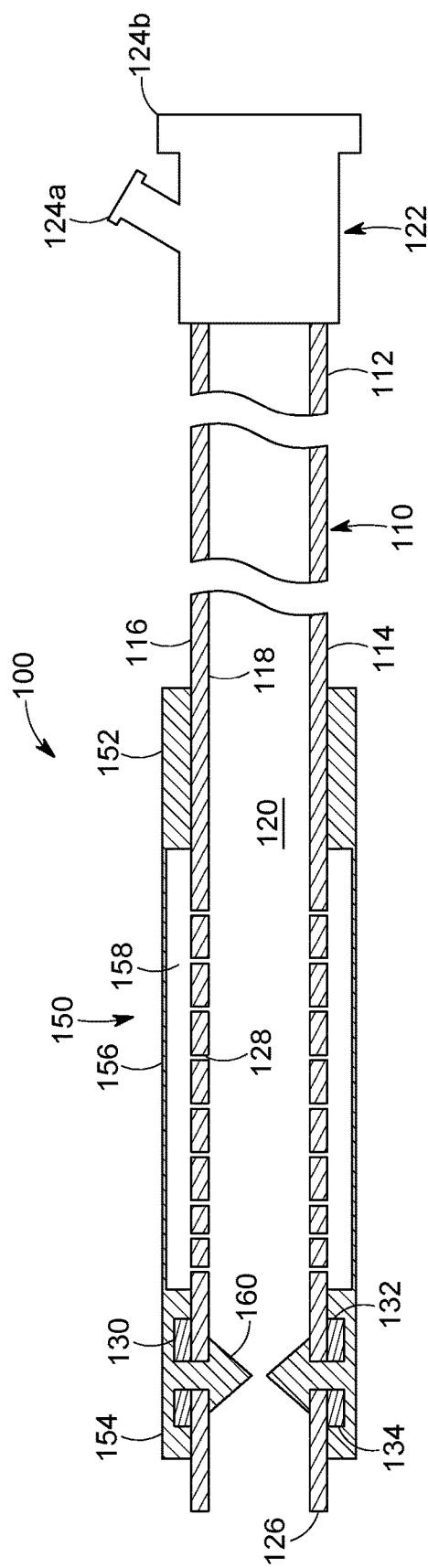
FIG. 1 illustrates a side partially cross-sectional view of an example balloon catheter according to embodiments of the disclosure.

With reference to the figures, various embodiments of a balloon guide catheter or balloon catheter will be described. The figures are intended to facilitate description of the disclosure and are not necessarily drawn to scale. Certain specific details may be set forth in the figures and description to provide a thorough understanding of the disclosure. It will be apparent to one of ordinary skill in the art that some of these specific details may not be employed to practice embodiments of the disclosure. In other instances, structures, materials, components, systems, and/or operations often associated with intravascular procedures may not be shown or described in detail to avoid unnecessarily obscuring description of embodiments of the disclosure.

It should be pointed that while some embodiments of the disclosure are shown and described as a balloon guide catheter in conjunction with aspiration thrombectomy, the balloon catheter, catheter assembly, and method described herein can be used for other procedures including interventional therapy, diagnosis, and imaging. The term "balloon guide catheter" may be used interchangeably with the term "balloon catheter."

Embodiments of the disclosure provide a single lumen balloon catheter or balloon guide catheter. A seal is formed on the inner surface of the balloon catheter to fluid-tight seal an elongate member such as an aspiration catheter positioned in the lumen of the balloon catheter. The dead space between the inner surface of the balloon catheter, the outer surface of the elongate member, and the seal forms an inflation lumen for the balloon. The seal on the inner surface of the balloon catheter can be formed from a distal end portion of the balloon which extends through the wall of the balloon catheter into the lumen. The seal can be formed via thermal compression of the balloon material through holes drilled in the balloon catheter and/or a marker band at the distal end of the balloon catheter. A mandrel can be placed in the lumen of the balloon catheter to aid thermal compression of the balloon material in forming the seal. The mandrel may have a notch or recessed area with a reduced diameter directly under or facing the holes in the balloon catheter or the marker band. The balloon material can be driven through the holes into the recessed area of the mandrel by compression, forming a circumferential seal on the inner surface of the balloon catheter.

The balloon catheter of the disclosure allows an inflation lumen to be formed between the inner surface of the balloon catheter and the outer surface of an elongate member such as an aspiration catheter in the lumen of the balloon catheter. By forming an inflation lumen this way, significant space savings can be realized, thereby allowing for a much larger lumen size for a given outer diameter of the balloon catheter. Furthermore, the balloon catheter of the disclosure allows for quick and easy removal of the air from the inflation lumen and the balloon in preparation for use. By way of example, in preparation of the balloon catheter for use, an aspiration catheter can be inserted in the lumen of the balloon catheter and positioned immediately proximal to the seal. Then, the lumen of the balloon catheter can be flushed with a fluid such as saline or a mixture containing a contrast agent until no air is observed to emerge from the tip of the balloon catheter. Then, the aspiration catheter can be advanced past the seal to form an inflation lumen between the inner surface of the balloon catheter and the outer surface of the aspiration catheter for inflating and/or deflating the balloon.

Figure 2:
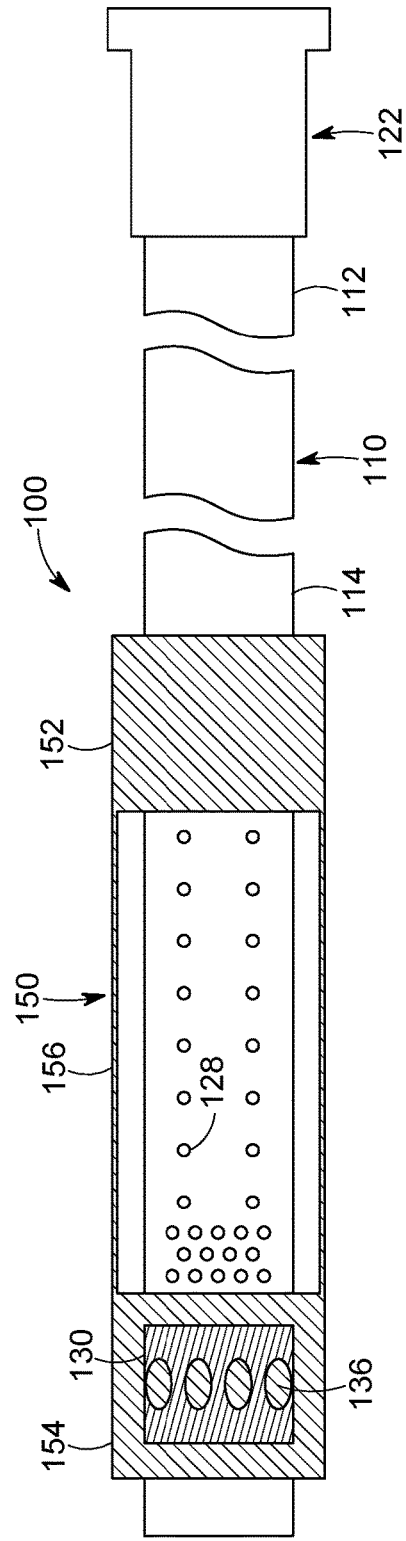
FIG. 2 illustrates a top partially cutaway view of an example balloon catheter according to embodiments of the disclosure.

With reference to FIGS. 1 and 2, an example balloon guide catheter or balloon catheter 100 according to embodiments of the disclosure is now described. FIG. 1 is a side partially cross-sectional view and FIG. 2 a top partially cutaway view of the balloon catheter 100. In general, the balloon catheter 100 comprises an elongate tubular body 110, a balloon 150 circumferentially around a portion of the tubular body 110, and a seal 160 on the inner surface of the tubular body 110. The tubular body 110 comprises a proximal end portion 112, a distal end portion 114, and a lumen 120 extending between the proximal end portion 112 and the distal end portion 114. The proximal end portion 112 of the tubular body 110 can be coupled to a hub 122, which can be provided with one or more ports e.g., a port 124a for connecting with a fluid source such as saline or a mixture containing a contrast agent and a port 124b for receiving an elongate member such as an aspiration catheter or guidewire etc. The distal end portion 114 of the tubular body 110 may be terminated with an opening 126. The tubular body 110 has an outer surface 116 and an inner surface 118 defining the lumen 120 of the tubular body 110. The balloon 150 may be located at the distal end portion 114 of the tubular body 110. Alternatively, the balloon 150 may be located at other locations such as at a middle portion of the tubular body. The balloon 150 comprises a proximal end portion 152, a distal end portion 154, and a distensible portion 156 between the proximal end portion 152 and the distal end portion 154. The proximal end portion 152 and the distal end portion 154 of the balloon 150 may be secured to the outer surface 116 of the tubular body 110 via any suitable means such as bonding. The distensible portion 156 of the balloon 150 and a portion of the outer surface 116 of the tubular body 110 defines an interior 158. One or more conduits or passages 128 may be provided through the wall of the tubular body 110, allowing the interior 158 of the balloon 150 to be in fluid communication with the lumen 120 of the tubular body 110. The distal end portion 154 of the balloon 150 may extend through the outer surface 116 and the inner surface 118 of the tubular body 110, or through the wall of the tubular body 110, into the lumen 120 of the tubular body 110, forming a sealing portion or seal 160 circumferentially around the inner surface 118 of the tubular body 110. In some embodiments of the disclosure, a radiopaque marker 130 may be disposed at the distal end portion 114 of the tubular body 110 and adjacent to the distal end portion 154 of the balloon 150. As such, the radiopaque marker 130 can indicate the position of the seal 160, allowing the user to determine if an elongate member such as an aspiration catheter in the lumen 120 of the tubular body 110 is positioned within the seal 160 or not by using e.g., x-ray fluoroscopy. By way of example, an aspiration catheter may include a radiopaque marker at its distal end. By viewing the positions of the radiopaque marker 130 on the balloon catheter 100 and the radiopaque marker on the aspiration catheter via e.g., x-ray fluoroscopy, the user can determine if the aspiration catheter is positioned proximal to the seal 160 (a non-sealing position) or within the seal 160 (a sealing position), to be described in greater detail in conjunction with FIGS. 3-4.

With reference to FIGS. 1 and 2, the tubular body 110 of the balloon catheter 100 may comprise a catheter tube constructed from a polymeric, metallic, or other suitable material. The tubular body 110 may comprise multiple layers. For example, the tubular body 110 may include an inner liner constructed from a lubricious or low-friction material to provide a smooth surface for advancement of devices or objects through the inner lumen 120. Suitable lubricious materials include but are not limited to polytetrafluoroethylene (PTFE), fluorinated ethylene propylene (FEP), and other suitable polymeric materials. The tubular body 110 may include a reinforcement layer constructed to prevent kinking or flattening of the tubular body in navigation through a tortuous vasculature. The reinforcement layer can be made from metal such as stainless steel, nitinol, or from polymers, or any combinations thereof. The reinforcement layer can be in a structure of a coil or braid, or flexible tubing with a laser-cut pattern, or a hypotube such as a cut nitinol hypotube or cut rigid polymer, or some other metallic tube. The reinforcement layer may extend from the proximal end portion 112 to the distal end portion 114 of the elongate tubular body 110, or substantially entire length of the elongate tubular body 110. Alternatively, the reinforcement layer may extend partially along the elongate tubular body. For example, the reinforcement layer may be omitted in a portion of the proximal end portion 112 of the elongate tubular body 110. The tubular body 110 may also include a jacket or sheath layer to provide mechanical integrity to the tubular body. The jacket layer may be constructed from a material such as a thermoplastic elastomer (TPE) e.g., polyether block amide, thermoplastic polyurethane, polyethylene, nylon, or the like. The jacket layer may extend from the proximal end portion 112 to the distal end portion 114 of the elongate tubular body 110. Optionally, the tubular body 110 may include an external coating. A thermoplastic polymeric material (e.g., Pebax®) may provide variable stiffness of the tubular body. A hydrophilic coating may be applied to the shaft and possibly the balloon as well to lower friction when navigating through arterial vessels.

With reference to FIGS. 1 and 2, the tubular body 110 of the balloon catheter 100 may be provided with plural conduits or passages 128 to allow the interior 158 of the balloon 150 to be in fluid communication with the lumen 120 of the tubular body 110. The plural passages 128 allow a fluid such as saline or a contrast agent to be injected into or exit from the balloon 150 for inflation and/or deflation of the balloon 150. The passages 128 can be formed via any suitable means including laser cutting, etching, precision machining, or the like. The passages 128 can be formed before the balloon 150 is secured to the tubular body 110. According to embodiments of the disclosure, the number or density of the passages 128 adjacent to the distal end portion 154 of the balloon 150 is greater than the number or density of the passages 128 adjacent to the proximal end portion 152 of the balloon 150. By way of example, the number or density of the passages 128 adjacent to the distal end portion 154 of the balloon 150 is about twice as the number or density of the passages 128 adjacent to the proximal end portion 152 of the balloon 150. As another example, the number or density of the passages 128 adjacent to the distal end portion 154 of the balloon 150 is about three times as the number or density of the passages 12 adjacent to the proximal end portion 152 of the balloon 150. The difference in the number or density of the passages 128 adjacent to the distal end 154 and proximal end 152 of the balloon 150 allows for quick and easy preparation of the balloon catheter 100 for use, to be further described in conjunction with FIGS. 3 and 4.

With reference to FIGS. 1 and 2, the tubular body 110 of the balloon catheter 100 may include a radiopaque marker 130 to indicate the position of the seal or sealing portion 160 of the balloon 150. By way of example, the radiopaque marker 130 may be located at the distal end portion 154 of the balloon 150. The radiopaque marker 130 may have a proximal end 132, a distal end 134, and be provided with plural holes 136 to allow the balloon material to be pressed through in forming the seal 160. The proximal end 132 of the radiopaque marker 130 may traverse or span beyond the seal 160 with a predetermined distance to provide an indication of the location of the seal 160 relative to the radiopaque marker 130, which will be described further in conjunction with FIGS. 3 and 4.

The radiopaque marker 130 can be constructed from a suitable radiopaque material which can be visualized via x-ray fluoroscopy. Suitable radiopaque materials for the distal markers include but are not limited to platinum, gold, tungsten, tantalum, barium, Iodin, bismuth, etc., or an alloy containing any of the above metals. The radiopaque marker 130 may be in the form of a coil wound on the tubular body 110. The radiopaque marker 130 may also be in the form of a band or coating on the tubular body.

The tubular body 110 of the balloon catheter may have a size and/or dimension suitable for medical applications. By way of example, the tubular body 110 may comprise a distal end portion 114 having an outer diameter ranging from 0.092 inches to 0.118 inches, and an inner diameter ranging from 0.075 inches to 0.110 inches. According to embodiments of the disclosure, a distal end portion 114 of the tubular body 110 may have an outer diameter 0.092 inches and an inner diameter ranging from 0.075 inches to 0.081 inches. According to alternative embodiments of the disclosure, a distal end portion 114 of the tubular body 110 may have an outer diameter 0.110 inches and an inner diameter ranging from 0.092 inches to 0.098 inches. According to alternative embodiments of the disclosure, a distal end portion 114 of the tubular body 110 may have an outer diameter 0.118 inches and an inner diameter ranging from 0.104 inches to 0.110 inches.

With reference to FIGS. 1 and 2, the balloon 150 can be constructed from an elastic and/or stretchable material such as a synthetic or naturally occurred polymeric material. Suitable materials for constructing the balloon 150 include but are not limited to rubber, latex, polyurethane, isoprene-based polymers or copolymers, silicone, and so on. As an example, Chronoprene® is a styrene-isoprene block copolymer and can be used to construct the balloon 150. Chronoprene® is commercially available from Mitsubishi Chemical, Japan.

With reference to FIGS. 1 and 2, the balloon 150 comprises a proximal end portion 152 and a distal end portion 154 each can be secured to the tubular body 110 via a suitable means such as bonding. The distal end portion 154 of the balloon 150 may extend through the wall of the tubular body 110 into the lumen 120, forming a sealing portion or seal 160 circumferentially around the inner surface 118 of the tubular body 110. To form the seal 160, plural through-holes may be drilled or provided in the wall of the tubular body 110 e.g., at the distal end portion 114. In embodiments where the tubular body 110 comprises a radiopaque marker 130 at the distal end, plural through-holes 136 may also be drilled or provided in the marker 130. A mandrel 170 having a notch or a recessed area 172 (FIG. 6A-6D) may be placed in the lumen 120 of the tubular body 110. The recessed area 172 of the mandrel 170 may be positioned facing the through-holes 136 in the tubular body 110 and the radiopaque marker 130. The balloon material can be pressed through the holes 136 by thermal compression. The balloon material driven through the holes 136 can be received in the recessed area 172 of the mandrel 170, forming a sealing portion or seal 160 circumferentially around the inner surface 118 of the tubular body 110.

FIGS. 6A-6D illustrate example mandrels 170 which can be used to form the seal 160 of the balloon catheter 100 according to embodiments of the disclosure. As shown, the recessed area 172 of the mandrel 170 can be configured and/or dimensioned to form a seal with various shapes and sizes. By way of example, the recessed area 172 of the mandrel 170 may have a cross-sectional shape of a triangle (FIG. 6A), trapezoid (FIGS. 6B and 6C), square or rectangle (FIG. 6D), or other suitable geometrical shapes, to allow a seal having a corresponding shape to be formed. The reduced diameter or depth of the recess 172 of the mandrel 170 may be selected to form a seal 170 with an opening for receiving and providing a fluid-tight seal for an elongate member such as an aspiration catheter or guidewire.

Figure 3:
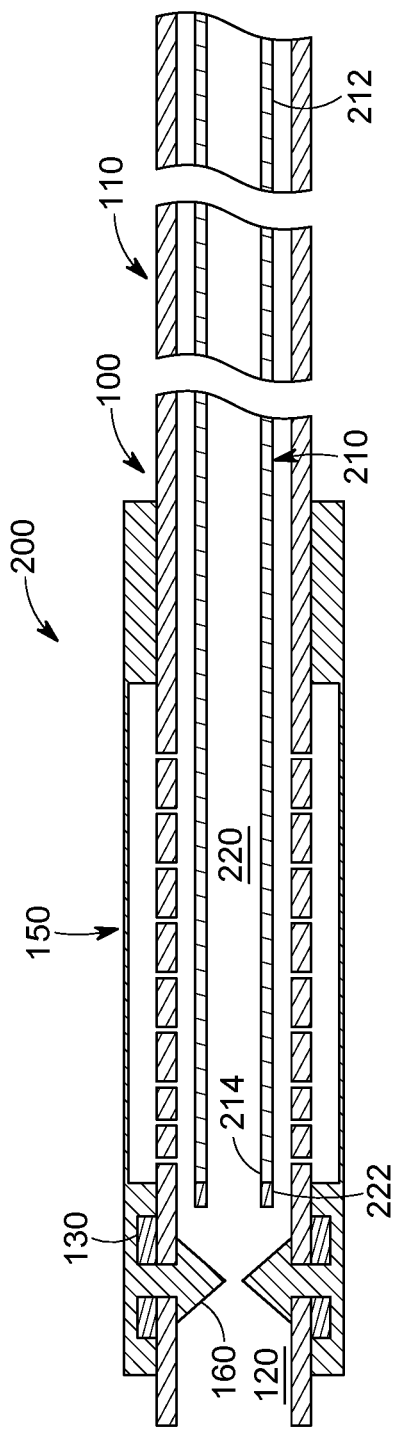
FIG. 3 illustrates an example catheter assembly according to embodiments of the disclosure. The example catheter assembly includes a balloon guide catheter and an aspiration catheter at a non-sealing position in the lumen of the balloon catheter guide.
Figure 4:
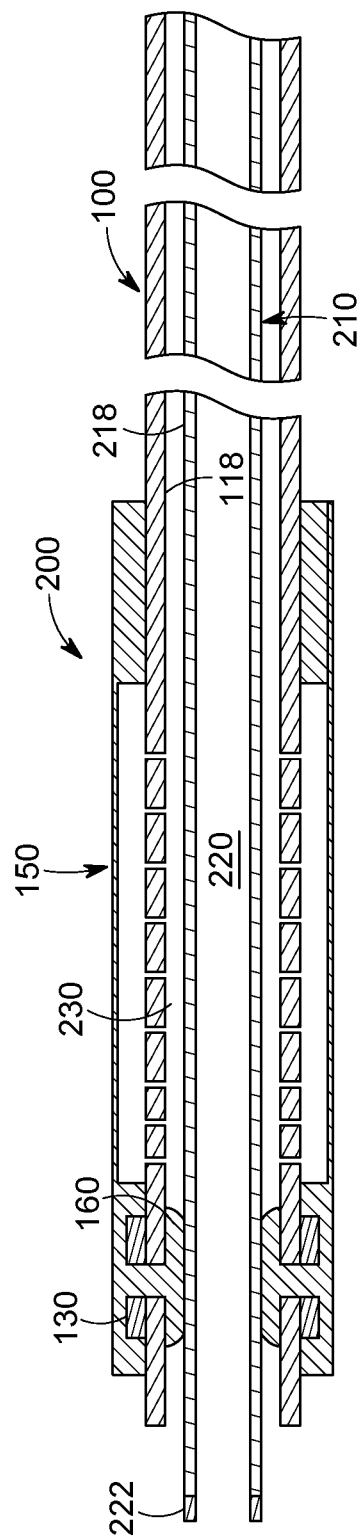
FIG. 4 illustrates an example catheter assembly according to embodiments of the disclosure. The example catheter assembly includes a balloon guide catheter and an aspiration catheter at a sealing position in the lumen of the balloon catheter guide.

With reference to FIGS. 3-4, an example catheter assembly 200 according to embodiments of the disclosure is now described. In general, the catheter assembly 200 comprises a balloon catheter 100 and an elongate member 210. The balloon catheter 100 comprises a tubular body 110 having a lumen 120, a balloon 150 circumferentially around a distal end portion of the tubular body 110, and a seal 160 formed on the inner surface of the tubular body 110. The elongate member 210 is longitudinally movable, proximally and/or distally, in the lumen 120 of the balloon catheter 110, and can be received by the seal 160 and fluid-tight sealed.

With reference to FIGS. 3-4, the balloon catheter 100 can be the same as or similar to the balloon catheter described above in conjunction with FIGS. 1 and 2. For example, the balloon catheter 100 may comprise a tubular body 110 including a proximal end portion 112, a distal end portion 114, and a lumen 120 extending between the proximal end portion 112 and the distal end portion 114. The proximal end portion 112 of the tubular body 110 may be coupled to a hub 122 which can be provided with one or more ports for connecting to a fluid source and/or receiving the elongate member 210 such as an aspiration catheter or guidewire etc. The distal end portion 114 of the tubular body 110 may be terminated with an opening 126. The balloon 150 may be located at the distal end portion 114 of the tubular body 110. The balloon 150 comprises a proximal end portion 152, a distal end portion 154, and a distensible portion 156 between the proximal end portion 152 and the distal end portion 154. The proximal end portion 152 and the distal end portion 154 may be secured to the tubular body 110 via any suitable means such as bonding or thermal bonding. The distensible portion 156 of the balloon 150 defines an interior 158 with the outer surface 116 of the tubular body 110. One or more conduits or passages 128 may be provided through the wall of the tubular body 110, allowing the interior 158 to be in fluid communication with the lumen 120 of the tubular body 110. The distal end portion 154 of the balloon 150 may extend through the outer surface 116 and inner surface 118 of the tubular body 110, or through the wall of the tubular body 110, into the lumen 120, forming a sealing portion or seal 160 circumferentially around the inner surface 118 of the tubular body 110. A radiopaque marker 130 may be disposed at the distal end portion 114 of the tubular body 110 and adjacent to the distal end portion 154 of the balloon 150. As such, the radiopaque marker 130 can indicate the position of the seal 160.

With reference to FIGS. 3-4, the elongate member 210 can be an aspiration catheter, a guidewire, or a dilator, a select catheter, or an elongate member carrying other devices for interventional therapy, diagnosis, imaging, etc. By way of example, the elongate member 210 may be a catheter such as an aspiration catheter having a proximal end portion 212, a distal end portion 214, and a lumen 220 extending between the proximal end portion 212 and the distal end portion 214. The proximal end portion 212 of the elongate member 210 may be configured to connect to a vacuum source. The distal end portion 214 of the elongate member 210 may be terminated with an opening having a size and shape configured for aspiration thrombectomy. The aspiration catheter 210 may be constructed to include multiple layers, e.g., an inner layer, a reinforcement layer, and a jacket or sheath layer, and one or more external coatings as described above in connection with the tubular body 110 of the balloon catheter 100. A radiopaque marker 222 may be provided at the distal end portion 214 of the aspiration catheter 210.

With reference to FIGS. 3-4, the elongate member 210 is longitudinally movable in the lumen 120 of the balloon catheter 100 between a non-sealing or first position (FIG. 3) and a sealing or second position (FIG. 4). At a non-sealing position such as shown in FIG. 3, the distal end 214 of the elongate member 210 is positioned proximal to the seal 160 of the balloon catheter 100. As such, a fluid such as saline or a contrast agent from the proximal end 212 of the aspiration catheter 210 and/or from the proximal end 112 of the balloon catheter 100 may flush out and exit the opening end 126 of the balloon catheter 100 to remove the air that may be present in the lumen of balloon catheter 100. At a sealing position such as shown in FIG. 4, a distal end portion 214 or a portion of the elongate member 210 is received within the seal 160 and fluid-tight sealed. As such, an inflation lumen 230 is formed between the seal 160, the inner surface 118 of the tubular body 110 of the balloon catheter 100, and the outer surface 218 of the elongate member 210. A pressurized fluid such as saline or a contrast agent may be introduced into the inflation lumen 230 from the proximal end portion 112 of the tubular body 110 of the balloon catheter 100. The pressurized fluid may then enter the interior 158 of the balloon 150 via the conduits or passages 128 in the tubular body 110 to inflate the balloon 150. To deflate the balloon 150, the elongate member 210 may be moved to a non-sealing position, e.g., by withdrawing the elongate member 210 proximally, to allow the fluid in the balloon to exit via passages 128, pass through the opening in the sealing 160 and flow out the opening of the balloon catheter 100.

Figure 5:
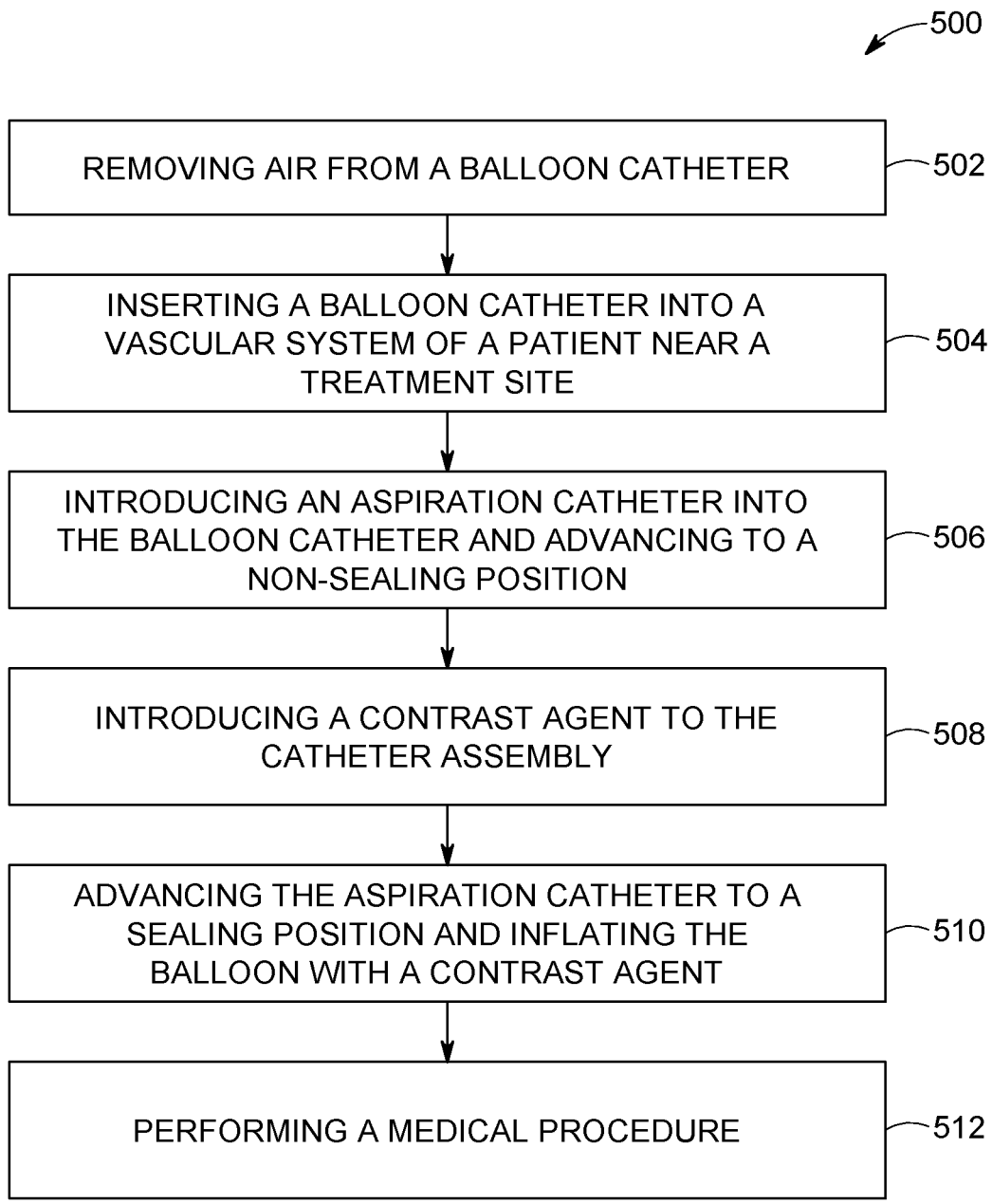
FIG. 5 is a flowchart illustrating a method according to embodiments of the disclosure.
Figure 6A:
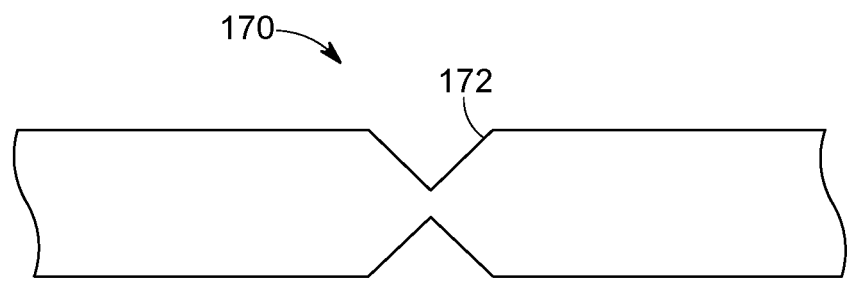
FIGS. 6A-6D illustrate example mandrels which can be used to make a a balloon catheter according to embodiments of the disclosure.
Figure 6B:
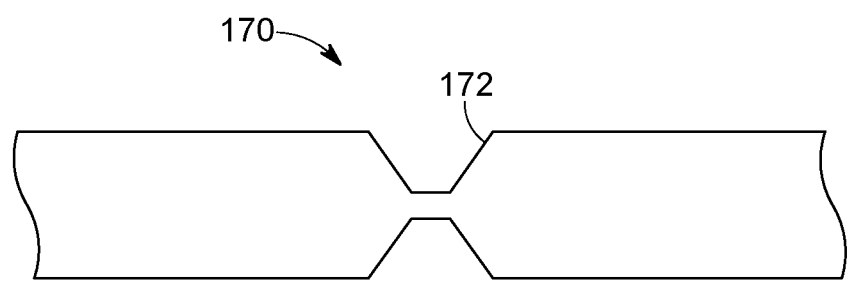
Figure 6C:
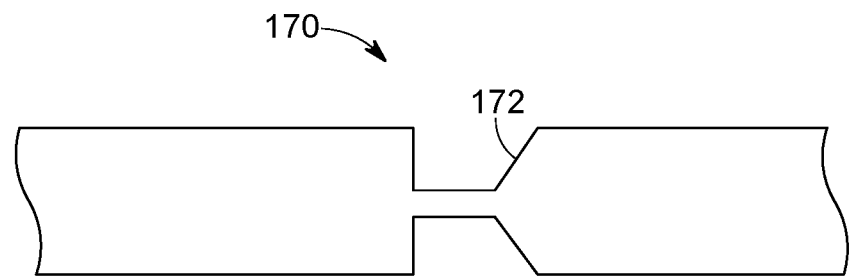
Figure 6D:
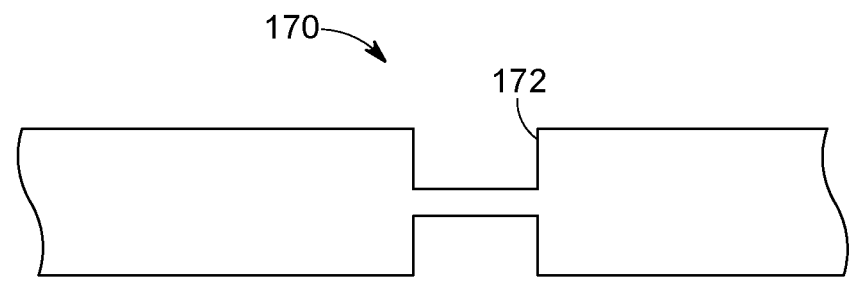

With reference now to FIG. 5, a method of using a catheter assembly in a medical procedure such as aspiration thrombectomy is now described. The catheter assembly may be any of the catheter assemblies described above in conjunction with FIGS. 3 and 4. The method 500 may start at step 502 where a balloon catheter is prepared by removing the air that may be present in the balloon and lumen of the balloon catheter. To remove or purge the air from the balloon catheter, a dilator may be inserted into the lumen of the balloon catheter. Alternatively, a select catheter or an aspiration catheter may be used in lieu of a dilator to purge the air inside the balloon catheter before use. The dilator can be positioned such that its distal end is just proximal to the seal of the balloon catheter, i.e., the dilator is positioned at a non-sealing position relative to the balloon catheter. The balloon catheter and the dilator can be then connected to a source of fluid such as saline or a contrast agent respectively. The fluid flushes through the lumen of the balloon catheter to purge the air inside the lumen of the balloon catheter. The dilator can be then advanced into the seal to a sealing position. At the sealing position, an inflation lumen is formed between the dilator and the balloon catheter. A fluid can be then injected into the inflation lumen to inflate the balloon. To facilitate removal of the air in the balloon, the tip of the balloon catheter may be held upward and tapped to allow any air bubbles inside the balloon to move up to the distal end of the balloon. Then, the dilator may be withdrawn proximally to a non-sealing position to deflate the balloon. Because the number of conduits or passages in the balloon catheter adjacent to the distal end of the balloon is greater than that adjacent to the proximal end of the balloon, the fluid will exit the passages adjacent to the distal end of balloon, causing a flow in the balloon from the proximal end to the distal end thereby flushing out the air inside the balloon. The balloon can be now filled with a contrast agent is ready to be inserted into the vascular system of the patient.

At step 504, the balloon catheter can be inserted into the vascular system of the patient through an entry vessel e.g., the femoral artery or inferior vena cava in the groin area. The balloon catheter can be advanced to a treatment site in the vascular system e.g., at ICA by any known techniques, for example, with the aid of a select catheter and/or a guidewire.

At step 506, once the balloon catheter is in place near the treatment site, an aspiration catheter can be inserted into the balloon catheter. The aspiration catheter can be advanced and positioned such that its distal end is just proximal to the seal of the balloon catheter, i.e., the aspiration catheter is positioned at a non-sealing position relative to the balloon catheter. The positioning of the aspiration catheter to a non-sealing position can be facilitated by viewing the radiopaque markers on the distal end of the aspiration catheter and in the balloon catheter via x-ray fluoroscope.

At step 508, a contrast agent may be introduced into the catheter assembly to remove saline or any other fluid that may remain in the balloon catheter. The balloon catheter and the aspiration catheter can be connected to a source of a contrast agent respectively to flush the lumens until the contrast agent is clearly observed exiting the lumen of the balloon catheter. This step can be important because if saline or other fluid remains in the catheter lumen or balloon, the inflation of the balloon may not be observed via x-ray fluoroscopy, raising the risk of rupturing the balloon.

At step 510, the aspiration catheter can be then advanced distally to a sealing position to form a fluid-tight seal and an inflation lumen between the aspiration catheter and the balloon catheter. A contrast agent can be then injected into the inflation lumen and the balloon via the passages in the wall of the balloon catheter to inflate the balloon. The inflated balloon can now arrest the blood flow. The aspiration catheter can be advanced distally to the treatment site to perform a medical procedure such as aspiration thrombectomy. One of ordinary skill in the art understands that the aspiration catheter can reach to the treatment site to perform the procedure before or after the balloon is inflated. After the medical procedure, the aspiration catheter and the balloon catheter can be removed out of the patient.

Various embodiments of balloon catheter guide have been described with reference to figures. It should be noted that an aspect described in conjunction with a particular embodiment is not necessarily limited to that embodiment and can be practiced in any other embodiments. The figures are intended for illustration of embodiments but not for exhaustive description or limitation on the scope of the disclosure. Alternative structures, components, and materials will be readily recognized as being viable without departing from the principle of the claimed invention.

All technical and scientific terms used herein have the meaning as commonly understood by one of ordinary skill in the art unless specifically defined otherwise. As used in the description and appended claims, the singular forms of "a," "an," and "the" include plural references unless the context clearly dictates otherwise. The term "or" refers to a nonexclusive "or" unless the context clearly dictates otherwise. The term "proximal" and its grammatically equivalent refers to a position, direction or orientation towards the user or physician's side. The term "distal" and its grammatically equivalent refers to a position, direction or orientation away from the user or physician's side. The term "first" or "second" etc. may be used to distinguish one element from another in describing various similar elements. It should be noted the terms "first" and "second" as used herein include references to two or more than two. Further, the use of the term "first" or "second" should not be construed as in any particular order unless the context clearly dictates otherwise. The order in which the method steps are performed may be changed in alternative embodiments. One or more method steps may be skipped altogether, and one or more optional steps may be included. All numeric values are provided for illustration and assumed to be modified by the term "about," whether or not explicitly indicated. The term "about" generally refers to a range of numbers that one of skill in the art would consider equivalent to the recited value e.g., having the same function or result. The term "about" may include numbers that are rounded to the nearest significant figure. The recitation of a numerical range by endpoints includes all numbers within that range.

Those skilled in the art will appreciate that various other modifications may be made. All these or other variations and modifications are contemplated by the inventors and within the scope of the invention.

What is claimed is:

1. A balloon catheter, comprising:
    a tubular body having an outer surface and an inner surface, the inner surface defining a lumen of the tubular body; and
    a balloon circumferentially around a portion of the tubular body, the balloon comprising a proximal end portion and a distal end portion each being secured to the tubular body, and a distensible portion defining an interior that is in fluid communication with the lumen of the tubular body, wherein
    the distal end portion of the balloon extends through the outer surface and the inner surface into the lumen of the tubular body, forming a sealing portion circumferentially around the inner surface of the tubular body.

2. The balloon catheter of claim 1, wherein the balloon is located adjacent to a distal end portion of the tubular body.

3. The balloon catheter of claim 2, further comprising a radiopaque marker disposed at the distal end portion of the tubular body, wherein the radiopaque marker indicates a position of the sealing portion of the balloon.

4. The balloon catheter of claim 3, the distal end portion of the balloon extends through the radiopaque marker into the lumen of the tubular body.

5. The balloon catheter of claim 4, wherein the radiopaque marker comprises a proximal end and a distal end, the proximal end of the radiopaque marker being proximal to the sealing portion of the balloon at a predetermined distance.

6. The balloon catheter of claim 1, wherein the tubular body is provided with plural passages in fluid communication with the interior of the balloon and the lumen of the tubular body, wherein a density of the plural passages adjacent to the distal end portion of the balloon is greater than a density of the plural passages adjacent to the proximal end portion of the balloon.

7. The balloon catheter of claim 1, wherein the tubular body has an outer diameter of 0.110 inches and an inner diameter of ranging from 0.092 inches to 0.098 inches.

8. The balloon catheter of claim 1, wherein the tubular body has an outer diameter of 0.092 inches and an inner diameter of ranging from 0.075 inches to 0.081 inches.

9. The balloon catheter of claim 1, wherein the sealing portion defines an opening having a diameter ranging from 0.087 inches to 0.091 inches configured to provide a fluid-tight seal for an elongate member having an outer diameter ranging from 0.092 inches to 0.096 inches.

10. The balloon catheter of claim 1, wherein the inner surface of the tubular body comprises polytetrafluoroethylene (PTFE), and the balloon is constructed from a material comprising a styrene-isoprene block copolymer.

11. A catheter assembly, comprising a balloon catheter having a lumen and an elongate member to be positioned in the lumen of the balloon catheter,
  wherein the balloon catheter comprises:
    a tubular body having an outer surface and an inner surface, the inner surface defining the lumen of the balloon catheter, and
    a balloon circumferentially around a distal end portion of the tubular body, the balloon comprising a proximal end portion and a distal end portion each being secured to the tubular body, and a distensible portion defining an interior that is in fluid communication with the lumen of the balloon catheter, the distal end portion of the balloon extending through the outer surface and the inner surface of the tubular body into the lumen of the balloon catheter, forming a sealing portion circumferentially around the inner surface of the tubular body, and
  wherein the elongate member is longitudinally movable in the lumen of the balloon catheter between a first position and a second position, wherein at the first position, the elongate member is proximal to the sealing portion allowing a fluid to pass through the sealing portion, and at the second position, the elongate member is within and substantially fluid-tight sealed by the sealing portion, thereby forming an inflation lumen between the elongate member and the tubular body of the balloon catheter for introducing a fluid to inflate the balloon.

12. The catheter assembly of claim 11, wherein when the elongate member is at the second position, a distal end portion of the elongate member extends out of the lumen of the balloon catheter to perform a medical procedure.

13. The catheter assembly of claim 11, wherein the elongate member comprises an aspiration catheter configured to perform aspiration thrombectomy.

14. The catheter assembly of claim 11, further comprising a radiopaque marker disposed at the distal end portion of the tubular body, wherein the radiopaque marker indicates a position of the sealing portion of the balloon.

15. The catheter assembly of claim 14, wherein the distal end portion of the balloon extends through the radiopaque marker.

16. The catheter assembly of claim 15, wherein the radiopaque marker comprises a proximal end and a distal end, the proximal end of the radiopaque marker being proximal to the sealing portion of the balloon at a predetermined distance.

17. The catheter assembly of claim 11, wherein the tubular body is provided with plural passages in fluid communication with the interior of the balloon and the lumen of the balloon catheter, wherein a density of the plural passages adjacent to the distal end portion of the balloon is greater than a density of the plural passages adjacent to the proximal end portion of the balloon.

18. The catheter assembly of claim 11, wherein the tubular body has an outer diameter of 0.110 inches and an inner diameter of ranging from 0.092 inches to 0.098 inches.

19. The catheter assembly of claim 11, wherein the tubular body has an outer diameter of 0.092 inches and an inner diameter of ranging from 0.075 inches to 0.081 inches.

20. The catheter assembly of claim 11, wherein the sealing portion defines an opening having a diameter ranging from 0.087 inches to 0.091 inches configured to provide a fluid-tight seal for an elongate member having an outer diameter ranging from 0.092 inches to 0.096 inches.

21. A method, comprising:
  providing a catheter assembly comprising a first catheter having a lumen and a second catheter having a lumen, the second catheter being configured to be positioned in the lumen of the first catheter,
  wherein the first catheter comprises:
    a tubular body having an outer surface and an inner surface, the inner surface defining the lumen of the first catheter, and
    a balloon circumferentially around a distal end portion of the tubular body, the balloon comprising a proximal end portion and a distal end portion each being secured to the tubular body, and a distensible portion defining an interior that is in fluid communication with the lumen of the first catheter, the distal end portion of the balloon extending through the outer surface and the inner surface of the tubular body into the lumen of the first catheter, forming a sealing portion circumferentially around the inner surface of the tubular body, and
  wherein the second catheter is longitudinally movable in the lumen of the first catheter between a first position and a second position, wherein at the first position, the second catheter is proximal to the sealing portion allowing a fluid to pass through the sealing portion, and at the second position the second catheter is within and substantially fluid-tight sealed by the sealing portion, thereby forming an inflation lumen between the second catheter and the tubular body of the first catheter for introducing a fluid to inflate the balloon;
  positioning the second catheter at the first position;
  introducing a fluid from a proximal end of the lumen of the first catheter and from a proximal end of the lumen of the second catheter and allowing the fluid to exit a distal end of the lumen of the first catheter and a distal end of the lumen of the second catheter;
  positioning the second catheter at the second position to form the inflation lumen;
  introducing a fluid into the inflation lumen to inflate the balloon of the first catheter; and
  withdrawing the second catheter proximally to allow the fluid in the balloon to exit.

22. The method of claim 21, wherein the tubular body of the first catheter is provided with plural passages in fluid communication with the interior of the balloon and the lumen of the first catheter, wherein a density of the plural passages adjacent to the distal end portion of the balloon is greater than a density of the plural passages adjacent to the proximal end portion of the balloon, and the method further comprising:
  before the step of withdrawing of the second catheter proximally, holding the catheter assembly to orient the distal end portion of the balloon upwardly, and tapping the balloon to allow air bubbles to move up to the distal end portion of the balloon.

23. The method of claim 22, wherein the density of the plural passages adjacent to the distal end portion of the balloon is at least twice the density of the plural passages adjacent to the proximal end portion of the balloon.

24. The method of claim 22, wherein the introducing of a fluid into the inflation lumen comprising introducing a contrast agent.

\* \* \* \* \*